March 10, 1959     M. HANSBURG     2,877,401
DELAY CIRCUIT FOR "ON-OFF" SERVO SYSTEM
Filed Dec. 30, 1955

INVENTOR.
MILTON HANSBURG
BY
*L. M. Smith Jr.*
ATTORNEYS

United States Patent Office 2,877,401
Patented Mar. 10, 1959

2,877,401

DELAY CIRCUIT FOR "ON-OFF" SERVO SYSTEM

Milton Hansburg, Weisel, Pa.

Application December 30, 1955, Serial No. 556,753

5 Claims. (Cl. 318—400)

(Granted under Title 35, U. S. Code (1952), sec. 266)

The invention described herein may be manufactured and used by or for the Government of the United States of America for governmental purposes without the payment of any royalties thereon or therefor.

The present invention relates to a delay circuit for an on-off servo system and more particularly to a delay circuit utilizing a pair of crystals and charging condensers for delaying the application of A. C. power to a servo motor or other load device.

In certain types of servo systems it is necessary to reduce the acceleration of the initial motion of the servo motor. For example, reduced acceleration is required in the third axis servo motor of magnetic anomaly detection equipment in the orientation of the magnetometer so as to permit the inner axis driven by a separate motor to follow within three minutes angular error the motion of the third axis. Should the third axis be initially accelerated at an excessive rate, the inner axis carrying the magnetometer will be unable to follow this closely in the initial stage. Thermistors have been used to accomplish this delay in such servo systems and have proved successful in their initial use. However, once heated by the passage of current the thermistors require a recovery period about ten times longer than the heating period. Therefore, in cases where the third axis duty cycle would not permit such a long recovery period the thermistor proves inadequate.

The present invention seeks to overcome the disadvantages of prior delay circuits in on-off servo systems by using a pair of crystal rectifiers in conjunction with a pair of charging condensers which act to delay the application of the full voltage to the servo motor during the period it takes for the condensers to be charged.

An object of the present invention is the provision of a delay circuit which may be utilized with an on-off servo system to reduce the acceleration of the initial motion.

Another object is to provide a coupling circuit which delays initially the transmission of full A. C. voltage applied to the input of a load device.

A further object of the invention is the provision of a circuit consisting of an R-C network and at least one diode for preventing the instantaneous building up of current and voltage in a designated input.

An additional object of the present invention is the provision of a simple on-off servo system including a servo motor, a delay circuit for reducing acceleration in the initial motion of the servo motor utilizing a pair of diodes in combination with a pair of condensers, and a three position switching arrangement permitting the selection of direction of motion of the servo motor and an off position permitting the discharge of the delay circuit thereby leaving the delay circuit in a position to be immediately effective upon actuation of the switch to one or two of the other positions.

The exact nature of this invention as well as other objects and advantages thereof will be readily apparent from consideration of the following specification relating to the annexed drawing in which.

Figure 1:
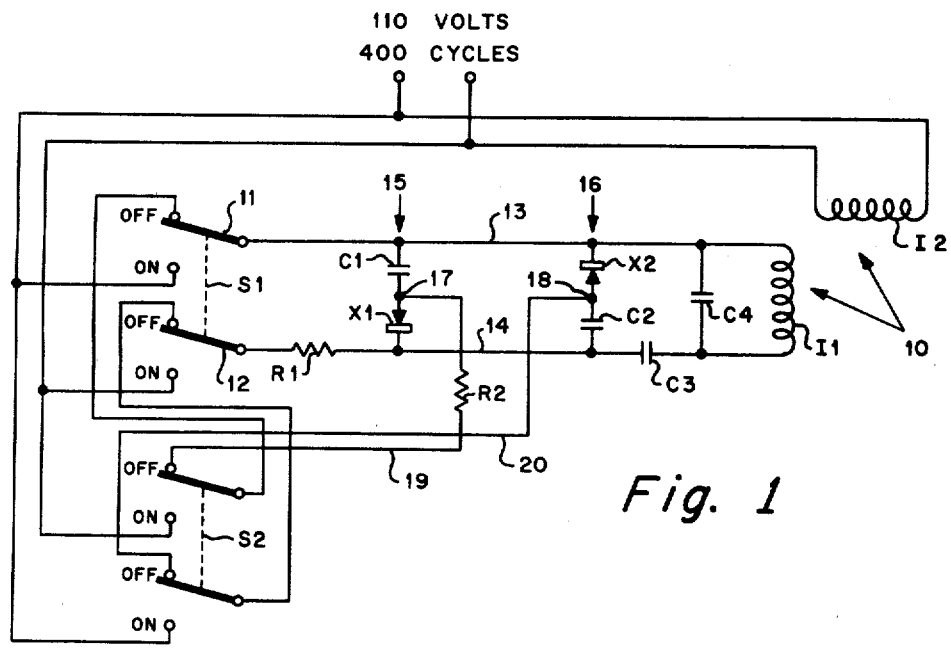
Fig. 1 shows a preferred embodiment of the invention.

Fig. 1 shows one specific form of the invention in which a 110 volt, 400 cycle per second power supply is supplied to coils $I_1$ and $I_2$ of servo motor 10. Variable phase coil $I_1$ is supplied through the micro switches $S_1$ or $S_2$ and the circuit illustrated; while fixed phase coil $I_2$ is provided with the 110 volt, 400 cycle voltage power directly. The direction of rotation for servo motor 10 is dependent upon the relative phase difference between the voltage supplied to coil $I_1$ and the coil $I_2$. If the signal supplied across coil $I_1$ leads in phase by 90° the voltage supplied across $I_2$, servo motor 10 will rotate in one direction. If the voltage supplied across $I_2$ is, however, shifted 180°, then the servo motor will rotate in the opposite direction. Micro switches $S_1$ and $S_2$ are selected so that each of these switches upon closing delivers the voltage across coil $I_1$ 180° apart in phase. Thus, the selection of switch $S_1$ or $S_2$ determines the direction of rotation of servo motor 10.

Switch $S_1$ is constructed of a pair of movable contacts 11 and 12 which are ganged to move between the "on" and "off" positions illustrated. Switch $S_2$ is of identical construction with $S_1$, however, the "on" contacts on each switch are connected to the power source in opposite senses to provide for reverse rotation of motor 10.

The delay circuit is interposed between the micro switches and coil $I_1$ of servo motor 10, which are joined by lines 13 and 14. A pair of lines 15 and 16 shunt coil $I_1$ and carry capacitor $C_1$ and diode $X_1$ in the former and capacitor $C_2$ and diode $X_2$ in the latter. Diodes $X_1$ and $X_2$ may be crystals or any other conventional uniflow device. It will be noted that the capacitor and diode in each of the two parallel connections 15 and 16 are oppositely poled for the reasons explained further below. Also included in the line between switch $S_1$ and one end of coil $I_1$ is a resistor $R_1$. It will be noted that two center taps 17 and 18 are provided between crystal $X_1$ and capacitor $C_1$ in connection 15 and capacitor $C_2$ and crystal $X_2$ of connection 16. These center taps are connected by lines 19 and 20, respectviely, to the "off" positions of micro switch $S_2$. A resistor $R_2$ is provided in line 19. Condensers $C_3$ and $C_4$ located in line 14 and across coil $I_1$, respectively, cause the 90° phase shift in the signal applied to this coil.

The operation of this circuit is as follows:

When switch $S_1$ is closed, the 110 v. power supply is placed across lines 13 and 14 leading to coil $I_1$. During one-half of the cycle the negative portion of the wave is directed to capacitor $C_1$ through diode $X_1$ while the positive portion of the wave is sent to capacitor $C_2$ through the crystal rectifier $X_2$, which in effect shorts out via condensers $C_1$ and $C_2$ the input circuit to the variable field $I_1$ of servo motor 10. This action occurs on both halves of the cycle until the condensers $C_1$ and $C_2$ approach their final charge at which time rectifiers $X_1$ and $X_2$ are rendered non-conducting and the full 110 volt supply is permitted to reach the variable field of the servo motor. For example, after condensers $C_1$ and $C_2$ are fully charged, the negative half of the cycle placed on line 14 to the cathode of crystal $X_1$ will not be directed to the capacitor $C_1$ because crystal $X_1$ has been rendered non-conducting by the negative charge on condenser $C_1$ facing the anode of crystal $X_1$. Therefore, the negative half of the cycle would be applied through the coil $I_1$ of the servo motor.

When switch $S_1$ is opened to terminate the operation of servo motor 10, it will be seen that lines 19 and 20 connected to the center taps 17 and 18 will permit condensers $C_1$ and $C_2$ to be discharged because the latter are shorted out by the wiring with switches $S_1$ and $S_2$ in their non-power positions.

Closing of switch $S_2$ instead of switch $S_1$ reverses the phase of the power supply supplied to coil $I_1$, therefore shifting the phase relationship between it and the power supply applied to coil $I_2$ of the servo motor. This causes rotation of servo motor 10 in the opposite direction. Thus, it is seen that the above arrangement provides three operating conditions:

(1) Switches $S_1$ and $S_2$ open as illustrated, in which case no power is supplied to motor 10 and a discharge path is provided for capacitors $C_1$ and $C_2$.

(2) Switch $S_1$ open, switch $S_2$ closed, in which the 400 cycle power supply is connected to give servo motion in a given direction; the condenser discharge paths are opened.

(3) Switch $S_1$ closed, switch $S_2$ open, in which the 400 cycle power supply is connected in opposite sense to give servo motion in the opposite direction from the given direction; the condenser discharge paths are open.

It is understood that the switching arrangement consisting of micro switches $S_1$ and $S_2$ may be manually or automatically actuated, or that any other suitable means of applying the power may be utilized, without departing from the principle of this invention. In addition, the delay circuit may be found applicable to other loads in addition to the servo motor illustrated.

Figure 2:
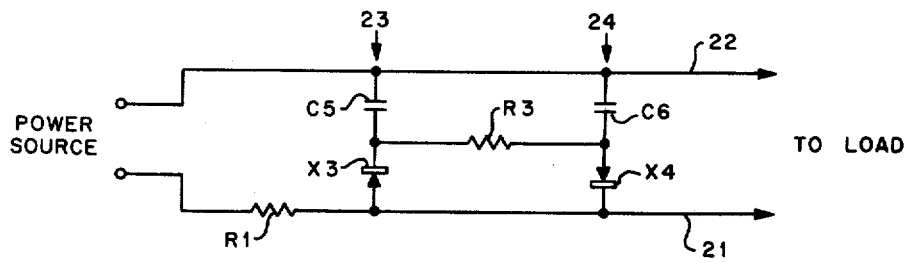
Fig. 2 illustrates another embodiment of the invention.

An alternate arrangement for accomplishing the delay described above is shown in Fig. 2. Lines 21 and 22 are connected from the power source to a load, such as, for example, coil $I_1$ of servo motor 10 as in the arrangement illustrated in Fig. 1. Connected across lines 21 and 22 is a pair of by-pass lines 23 and 24 containing respectively, a crystal diode $X_3$ and condenser $C_5$ in the first shunt and a crystal $X_4$ and a condenser $C_6$ in the second shunt. Across the center taps of each of the parallel circuits is connected a high resistive value resistor $R_3$, as illustrated. When power is applied across lines 21 and 22 it will be seen that during the negative half of the cycle on line 21 only diode $X_4$ is rendered conducting; thus capacitor $C_6$ is being charged during this half of the cycle. During the next half of the cycle only diode $X_3$ is rendered conducting, and capacitor $C_5$ is then in the process of being charged. During the portion of the cycle when diode $X_4$ is not conducting and capacitor $C_6$ is partially or fully charged, of course, there will be a tendency for capacitor $C_6$ to discharge through $R_3$. However, because of the very high resistive value of $R_3$ this discharging effect is kept at a low value and does not affect the ultimate operation of the circuit. When condensers $C_5$ and $C_6$ become fully charged after an interval of time, detectors $X_3$ and $X_4$ remain non-conducting at all times and the power supply is directed through coil $I_1$ of servo motor 10. The arrangement of Fig. 2 has the advantage of a simplified switching requirement which will discharge capacitor $C_5$ and $C_6$ during the off period without the need for additional switching during this period. However, one disadvantage of this arrangement is that resistor $R_3$, remaining in the circuit during the on period, reduces the power available to the servo motor.

It is thus seen that there has been provided an R-C delay circuit for use with alternating current loads. Obviously, many modifications and variations of the present invention are possible in the light of the above teachings. It is, therefore, to be understood that within the scope of the appended claims the invention may be practiced otherwise than as specifically described.

What is claimed is:

1. A delay circuit for a servo system comprising a servo motor having a variable field, power supply means for said variable field including switch means, and circuit means interposed between said switch means and said field for delaying the full application of power to said field upon placing said switch means in a power delivery position, said circuit means including diode and capacitance means across said motor field.

2. A delay circuit for a servo system comprising a servo motor having a variable field, power supply means for said variable field including switch means, circuit means interposed between said switch means and said field for delaying the full application of power to said field upon placing said switch means in a power delivery position, said delay circuit means including diode and capacitance means across said motor field, and means controlled by said switch means for discharging said capacitance means upon disconnecting said power means thereby readying said delay circuit for the next application of power to said variable field.

3. A delay circuit for a servo system comprising a servo motor having a variable field, power supply means for said variable field including switch means, circuit means interposed between said switch means and said field for delaying the full application of power to said field upon placing said switch means in a power delivery position, said delay circuit means comprising a pair of shunts across said variable field, each said shunt consisting of a diode and capacitor in series, and means connected to the point on each said shunt between said capacitor and diode for permitting complete discharge of said capacitors upon placing said switch means in a non-power position.

4. A delay circuit comprising a conductor having a power end and a load end and including a resistance element, a pair of shunt lines across said load end, each of said lines provided with a diode and capacitor in series oppositely situated and said diodes oppositely poled, and selector means for discharging said capacitors through said resistance element.

5. A delay circuit comprising a conductor having a power end and a load end and including a resistance element, a pair of shunt lines across said load end and each of said lines provided with a diode and capacitor in series oppositely situated and said diodes oppositely poled, switching means across the power end of said circuit having at least a first power position and a second position for discharging said capacitors through said resistance element.

References Cited in the file of this patent

UNITED STATES PATENTS

| 2,329,558 | Scherbatskoy | Sept. 14, 1943 |
| 2,406,978 | Wendt et al. | Sept. 3, 1946 |
| 2,512,637 | Frazier | June 27, 1950 |
| 2,544,653 | Browder | Mar. 13, 1951 |
| 2,554,905 | Hawkins et al. | May 29, 1951 |